(12) United States Patent  
Jovanovic et al.

(10) Patent No.: US 8,606,275 B2  
(45) Date of Patent: Dec. 10, 2013

(54) METHOD FOR IDENTIFYING MISSING NEIGHBORS AND FOR UPDATING CURRENT NEIGHBORS IN WIRELESS NETWORKS

(75) Inventors: Vladan Jovanovic, Leesburg, VA (US); David William Kleinbeck, Lee's Summit, MO (US)

(73) Assignee: Newfield Wireless, Berkeley, CA (US)

( * ) Notice: Subject to any disclaimer, the term of this patent is extended or adjusted under 35 U.S.C. 154(b) by 65 days.

(21) Appl. No.: 13/490,879

(22) Filed: Jun. 7, 2012

(65) Prior Publication Data

US 2012/0315895 A1  Dec. 13, 2012

Related U.S. Application Data

(60) Provisional application No. 61/520,275, filed on Jun. 7, 2011.

(51) Int. Cl.
*H04W 36/00* (2009.01)
*H04W 24/00* (2009.01)
*H04B 7/00* (2006.01)
*H04W 4/00* (2009.01)
*H04W 40/00* (2009.01)

(52) U.S. Cl.
USPC ........ 455/436; 455/525; 455/456.1; 455/446; 370/331

(58) Field of Classification Search
USPC ........ 455/422.1–424, 414.1–414.2, 436–444, 455/448–449, 456.1–457, 525, 446; 370/331, 338, 328
See application file for complete search history.

(56) References Cited

U.S. PATENT DOCUMENTS

| 5,646,632 | A   | 7/1997  | Khan et al. |
| 6,721,561 | B1  | 4/2004  | Jeong et al. |
| 7,826,847 | B1  | 11/2010 | Roskowski et al. |
| 7,907,949 | B2* | 3/2011  | Matsuzawa et al. .......... 455/436 |

(Continued)

FOREIGN PATENT DOCUMENTS

| GB | 2331892    | 6/1999 |
| WO | 2010049772 | 5/2010 |

OTHER PUBLICATIONS

3GPP2 C.R1002-A Version 1.0; May 2009; cdma2000 Evaluation Methodology Revision A; 258 pages.

(Continued)

*Primary Examiner* — Vladimir Magloire
*Assistant Examiner* — Michael Mapa
(74) *Attorney, Agent, or Firm* — Carmen Patti Law Group, LLC

(57) ABSTRACT

A method for identifying a missing neighbor in a wireless network includes receiving a report about two or more pilot signals measured by a mobile station; determining that one or more of the reported pilot signals is a missing neighbor not comprised in a current neighbor list of the mobile station; choosing one or more candidate sectors having a pilot signal with the same pilot identity as the missing neighbor; and selecting a most likely sector as the missing neighbor from the one or more candidate sectors, based on calculated distances between the mobile station and a source sector, between the mobile station and at least one of the one or more candidate sectors, and between the source sector and at least one of the one or more candidate sectors, so as to identify the missing neighbor in the wireless network.

16 Claims, 12 Drawing Sheets

(56) References Cited

U.S. PATENT DOCUMENTS

| | | | |
|---|---|---|---|
| 2002/0025822 A1* | 2/2002 | Hunzinger | 455/456 |
| 2003/0125046 A1* | 7/2003 | Riley et al. | 455/456 |
| 2006/0270400 A1 | 11/2006 | DaSilva et al. | |
| 2008/0113670 A1 | 5/2008 | Dufour et al. | |
| 2008/0160998 A1* | 7/2008 | Jovanovic | 455/436 |
| 2008/0225797 A1 | 9/2008 | Kim | |
| 2009/0011779 A1* | 1/2009 | MacNaughtan et al. | 455/456.6 |
| 2009/0137265 A1 | 5/2009 | Flore et al. | |
| 2011/0039575 A1 | 2/2011 | Castillo et al. | |
| 2012/0115509 A1 | 5/2012 | Sheynblat | |
| 2012/0309387 A1* | 12/2012 | MacGougan et al. | 455/425 |

OTHER PUBLICATIONS

R.H. Rapp; Geometric Geodesy—vol. 1 (Basic Principles); Department of Geodetic Science, The Ohio State University; Columbus, Ohio; Apr. 1979; Cover Page thru p. 178.

M. Hata; Empirical Formula for Propagation Loss in Land Mobile Radio Services; IEEE Transactions on Vehicular Technology; vol. VT-29; No. 3; pp. 317-325; Aug. 1980.

3GPP TS 25.402; 3rd Generation Partnership Project; Technical Specification Group Radio Access Network; Synchronisation in UTRAN Stage 2 (Release 10); V10.1.0; (Jun. 2011); pp. 1-51.

S.A. Zekavat et al; Handbook of Position Location: Theory, Practice and Advances; Wiley-IEEE Press, New York, NY; 2012; Intro pages plus Chapter 11 pp. 359-394.

S.C. Yang; CDMA RF System Engineering; Artech House, Norwood, MA; 1988; pp. 165-174.

3GPP TS 25.331; 3rd Generation Partnership Project; Technical Specification Group Radio Access Network; Radio Resource Control (RRC); Protocol Specification; Release 11; V11.1.0; (Mar. 2012); pp. 1-36; Section 10.3.7, pp. 976-1123.

3G99 TS 25.305; Version 10.0.0; Sep. 2010; Stage 2 functional specification of User Equipment Positioning in UTRAN; 80 pages.

C. Ubeda et al; Evaluation of a Time-Delay based Geolocation Algorithm in Real UMTS Networks; Int. Con. on Broadband and Biomed. Comm.; pp. 1-4; Dec. 2010.

* cited by examiner

400

401

| Cell1/ Sector 1 | Neighbors | | | | | | | | | | | | | |
|---|---|---|---|---|---|---|---|---|---|---|---|---|---|---|
| Neighbor # | 1 | 2 | 3 | 4 | 5 | 6 | 7 | 8 | 9 | 10 | 11 | 12 | 13 | 14 |
| Neighbor PN | 103 | 203 | 106 | 206 | 109 | 209 | 112 | 212 | 115 | 15 | 118 | 218 | 127 | 136 |
| Cell | 1 | 1 | 2 | 2 | 3 | 3 | 4 | 4 | 5 | 5 | 6 | 6 | 9 | 10 |
| Sector | 3 | 2 | 3 | 2 | 3 | 2 | 3 | 2 | 3 | 1 | 2 | 2 | 3 | 3 |

510 — Receive a report about two or more pilot signals measured by a mobile station 520 — Determine that one or more of the reported pilot signals is a missing neighbor not comprised in a current neighbor list of the mobile station 530 — Choose one or more candidate sectors having a pilot signal with the same pilot identity as the missing pilot 540 — Select a most likely sector as the missing neighbor from the one or more candidate sectors, based on calculated distances between the mobile station and a source sector, between the mobile station and at least one of the one or more candidate sectors, and between the source sector and at least one of the one or more candidate sectors, so as to update the current neighbor in the wireless network

| Cell | Sector | PN Offset | Latitude | Longitude |
|---|---|---|---|---|
| 1 | 1 | 3 | Xxxxxxxx1 | Yyyyyyyy1 |
| 1 | 2 | 203 | Xxxxxxxx1 | Yyyyyyyy1 |
| 1 | 3 | 103 | Xxxxxxxx1 | Yyyyyyyy1 |
| 2 | 1 | 6 | Xxxxxxxx2 | Yyyyyyyy2 |
| 2 | 2 | 206 | Xxxxxxxx2 | Yyyyyyyy2 |
| 2 | 3 | 106 | Xxxxxxxx2 | Yyyyyyyy2 |
| 3 | 1 | 9 | Xxxxxxxx3 | Yyyyyyyy3 |
| 3 | 2 | 209 | Xxxxxxxx3 | Yyyyyyyy3 |
| 3 | 3 | 109 | Xxxxxxxx3 | Yyyyyyyy3 |
| 4 | 1 | 12 | Xxxxxxxx4 | Yyyyyyyy4 |
| 4 | 2 | 121 | Xxxxxxxx4 | Yyyyyyyy4 |
| 4 | 3 | 112 | Xxxxxxxx4 | Yyyyyyyy4 |
| 5 | 1 | 15 | Xxxxxxxx5 | Yyyyyyyy5 |
| 5 | 2 | 215 | Xxxxxxxx5 | Yyyyyyyy5 |
| 5 | 3 | 115 | Xxxxxxxx5 | Yyyyyyyy5 |
| 6 | 1 | 18 | Xxxxxxxx6 | Yyyyyyyy6 |
| 6 | 2 | 218 | Xxxxxxxx6 | Yyyyyyyy6 |
| 6 | 3 | 118 | Xxxxxxxx6 | Yyyyyyyy6 |
| 7 | 1 | 21 | Xxxxxxxx7 | Yyyyyyyy7 |
| 7 | 2 | 221 | Xxxxxxxx7 | Yyyyyyyy7 |
| 7 | 3 | 121 | Xxxxxxxx7 | Yyyyyyyy7 |
| 8 | 1 | 24 | Xxxxxxxx8 | Yyyyyyyy8 |
| 8 | 2 | 224 | Xxxxxxxx8 | Yyyyyyyy8 |
| 8 | 3 | 124 | Xxxxxxxx8 | Yyyyyyyy8 |
| ... | ... | ... | ... | ... |
| 103 | 1 | 21 | Xxxxxx103 | Yyyyyy103 |
| 103 | 2 | 221 | Xxxxxx103 | Yyyyyy103 |
| 103 | 3 | 121 | Xxxxxx103 | Yyyyyy103 |
| ... | ... | ... | ... | ... |
| 217 | 1 | 21 | Xxxxxx217 | Yyyyyy217 |
| 217 | 2 | 221 | Xxxxxx217 | Yyyyyy217 |
| 217 | 3 | 121 | Xxxxxx217 | Yyyyyy217 |
| ... | ... | ... | ... | ... |

| Candidate | PN Offset | Latitude | Longitude | Source - Candidate Distance |
|---|---|---|---|---|
| Cell 7 / Sector 3 | 121 | Xxxxxxxx7 | Yyyyyyyy7 | 1.46 Miles |
| Cell 103 / Sector 3 | 121 | Xxxxxxx103 | Yyyyyyy103 | 7.53 Miles |
| Cell 217 / Sector 3 | 121 | Xxxxxxx217 | Yyyyyyy217 | 19.4 Miles |
| . . . | | . . . | . . . | . . . |

FIG. 10

| Cell | Sector | PN Offset | Latitude | Longitude | Ant Height | Ant Type | Ant Azimuth | Ant Tilt | Pilot Power | Ant. Beamwidth Horiz | Ant. Beamwidth Vert |
|---|---|---|---|---|---|---|---|---|---|---|---|
| 1 | 1 | 3 | Xxxx1 | Yyyy1 | Hhh1 | Ant1,1 | Azm1,1 | Tlt1,1 | PPwr1,1 | BWh1,1 | BWv1,1 |
| 1 | 2 | 203 | Xxxx1 | Yyyy1 | Hhh1 | Ant1,2 | Azm1,2 | Tlt1,2 | PPwr1,2 | BWh1,2 | BWv1,2 |
| 1 | 3 | 103 | Xxxx1 | Yyyy1 | Hhh1 | Ant1,3 | Azm1,3 | Tlt1,3 | PPwr1,3 | BWh1,3 | BWv1,3 |
| 2 | 1 | 6 | Xxxx2 | Yyyy2 | Hhh2 | Ant2,1 | Azm2,1 | Tlt2,1 | PPwr2,1 | BWh2,1 | BWv2,1 |
| 2 | 2 | 206 | Xxxx2 | Yyyy2 | Hhh2 | Ant2,2 | Azm2,2 | Tlt2,2 | PPwr2,2 | BWh2,2 | BWv2,2 |
| 2 | 3 | 106 | Xxxx2 | Yyyy2 | Hhh2 | Ant2,3 | Azm2,3 | Tlt2,3 | Ppwr2,3 | BWh2,3 | BWv2,3 |
| 3 | 1 | 9 | Xxxx3 | Yyyy3 | Hhh3 | Ant3,1 | Azm3,1 | Tlt3,1 | PPwr3,1 | BWh3,1 | BWv3,1 |
| 3 | 2 | 209 | Xxxx3 | Yyyy3 | Hhh3 | Ant3,2 | Azm3,2 | Tlt3,2 | PPwr3,2 | BWh3,2 | BWv3,2 |
| 3 | 3 | 109 | Xxxx3 | Yyyy3 | Hhh3 | Ant3,3 | Azm3,3 | Tlt3,3 | PPwr3,3 | BWh3,3 | BWv3,3 |
| 4 | 1 | 12 | Xxxx4 | Yyyy4 | Hhh4 | Ant4,1 | Azm4,1 | Tlt4,1 | PPwr4,1 | BWh4,1 | BWv4,1 |
| 4 | 2 | 121 | Xxxx4 | Yyyy4 | Hhh4 | Ant4,2 | Azm4,2 | Tlt4,2 | PPwr4,2 | BWh4,2 | BWv4,2 |
| 4 | 3 | 112 | Xxxx4 | Yyyy4 | Hhh4 | Ant4,3 | Azm4,3 | Tlt4,3 | PPwr4,3 | BWh4,3 | BWv4,3 |
| 5 | 1 | 15 | Xxxx5 | Yyyy5 | Hhh5 | Ant5,1 | Azm5,1 | Tlt5,1 | PPwr5,1 | BWh5,1 | BWv5,1 |
| 5 | 2 | 215 | Xxxx5 | Yyyy5 | Hhh5 | Ant5,2 | Azm5,2 | Tlt5,2 | PPwr5,2 | BWh5,2 | BWv5,2 |
| 5 | 3 | 115 | Xxxx5 | Yyyy5 | Hhh5 | Ant5,3 | Azm5,3 | Tlt5,3 | PPwr5,3 | BWh5,3 | BWv5,3 |
| 6 | 1 | 18 | Xxxx6 | Yyyy6 | Hhh6 | Ant6,1 | Azm6,1 | Tlt6,1 | PPwr6,1 | BWh6,1 | BWv6,1 |
| 6 | 2 | 218 | Xxxx6 | Yyyy6 | Hhh6 | Ant6,2 | Azm6,2 | Tlt6,2 | PPwr6,2 | BWh6,2 | BWv6,2 |
| 6 | 3 | 118 | Xxxx6 | Yyyy6 | Hhh6 | Ant6,3 | Azm6,3 | Tlt6,3 | PPwr6,3 | BWh6,3 | BWv6,3 |
| 7 | 1 | 21 | Xxxx7 | Yyyy7 | Hhh7 | Ant7,1 | Azm7,1 | Tlt7,1 | PPwr7,1 | BWh7,1 | BWv7,1 |
| 7 | 2 | 221 | Xxxx7 | Yyyy7 | Hhh7 | Ant7,2 | Azm7,2 | Tlt7,2 | PPwr7,2 | BWh7,2 | BWv7,2 |
| 7 | 3 | 121 | Xxxx7 | Yyyy7 | Hhh7 | Ant7,3 | Azm7,3 | Tlt7,3 | PPwr7,3 | BWh7,3 | BWv7,3 |
| 8 | 1 | 24 | Xxxx8 | Yyyy8 | Hhh8 | Ant8,1 | Azm8,1 | Tlt8,1 | PPwr8,1 | BWh8,1 | BWv8,1 |
| 8 | 2 | 224 | Xxxx8 | Yyyy8 | Hhh8 | Ant8,2 | Azm8,2 | Tlt8,2 | PPwr8,2 | BWh8,2 | BWv8,2 |
| 8 | 3 | 124 | Xxxx8 | Yyyy8 | Hhh8 | Ant8,3 | Azm8,3 | Tlt8,3 | PPwr8,3 | BWh8,3 | BWv8,3 |
| ... | ... | ... | ... | ... | ... | ... | ... | ... | ... | ... | ... |
| 103 | 1 | 21 | Xxxx103 | Yyyy103 | Hhh103 | Ant103,1 | Azm103,1 | Tlt103,1 | PPwr103,1 | BWh103,1 | BWv103,1 |
| 103 | 2 | 221 | Xxxx103 | Yyyy103 | Hhh103 | Ant103,2 | Azm103,2 | Tlt103,2 | PPwr103,2 | BWh103,2 | BWv103,2 |
| 103 | 3 | 121 | Xxxx103 | Yyyy103 | Hhh103 | Ant103,3 | Azm103,3 | Tlt103,3 | PPwr103,3 | BWh103,3 | BWv103,3 |
| 217 | 1 | 21 | Xxxx217 | Yyyy217 | Hhh217 | Ant217,1 | Azm217,1 | Tlt217,1 | PPwr217,1 | BWh217,1 | BWv217,1 |
| 217 | 2 | 221 | Xxxx217 | Yyyy217 | Hhh217 | Ant217,2 | Azm217,2 | Tlt217,2 | PPwr217,2 | BWh217,2 | BWv217,2 |
| 217 | 3 | 121 | Xxxx217 | Yyyy217 | Hhh217 | Ant217,3 | Azm217,3 | Tlt217,3 | PPwr217,3 | BWh217,3 | BWv217,3 |
| ... | ... | ... | ... | ... | ... | ... | ... | ... | ... | ... | ... |

METHOD FOR IDENTIFYING MISSING NEIGHBORS AND FOR UPDATING CURRENT NEIGHBORS IN WIRELESS NETWORKS

PRIORITY CLAIM

The present application claims the priority benefit of U.S. provisional patent application No. 61/520,275 filed Jun. 7, 2011 and entitled "Method for Identification of Missing Neighbors in Wireless Networks," the disclosure of which is incorporated herein by reference.

BACKGROUND

The invention relates generally to wireless networks, and more particularly to a method for identifying missing neighbors and for updating current neighbors in wireless networks.

SUMMARY

According to embodiments of the invention, a method for identifying a missing neighbor in a wireless network includes receiving a report about two or more pilot signals measured by a mobile station; determining that one or more of the reported pilot signals is a missing neighbor not comprised in a current neighbor list of the mobile station; choosing one or more candidate sectors having a pilot signal with the same pilot identity as the missing neighbor; and selecting a most likely sector as the missing neighbor from the one or more candidate sectors, based on calculated distances between the mobile station and a source sector, between the mobile station and at least one of the one or more candidate sectors, and between the source sector and at least one of the one or more candidate sectors, so as to identify the missing neighbor in the wireless network.

According to still further embodiments of the invention, a method for updating a current neighbor in a wireless network includes receiving a report about two or more pilot signals measured by a mobile station; choosing one or more candidate sectors having a pilot signal with the same pilot identity as a current neighbor comprised in a current neighbor list; and for the current neighbor, selecting a most likely sector from the one or more candidate sectors, based on calculated distances between the mobile station and a source sector, between the mobile station and one or more candidate sectors, and between the source sector and at least one of the one or more candidate sectors, so that the current neighbor that was previously misidentified can be detected and updated.

DESCRIPTION OF THE DRAWINGS

FIG. 4 is a table that shows an example of a neighbor list generated by a method for identifying a missing neighbor in a Code Division Multiple Access (CDMA) wireless network.

FIG. 5 is a flowchart showing the steps in a method for identifying a missing neighbor in a wireless network.

FIG. 9 is a table that shows a portion of a wireless network cell and sector database generated by a method for identifying a missing neighbor in a CDMA wireless network.

FIG. 10 is a table that shows an example of a calculation of a missing neighbor candidate in a method for identifying a missing neighbor in a wireless network.

FIG. 13 is a table showing a portion of an extended wireless network cell and sector database that can be used in the received power calculations in a method for identifying a missing neighbor in a wireless network.

DETAILED DESCRIPTION

Figure 1:
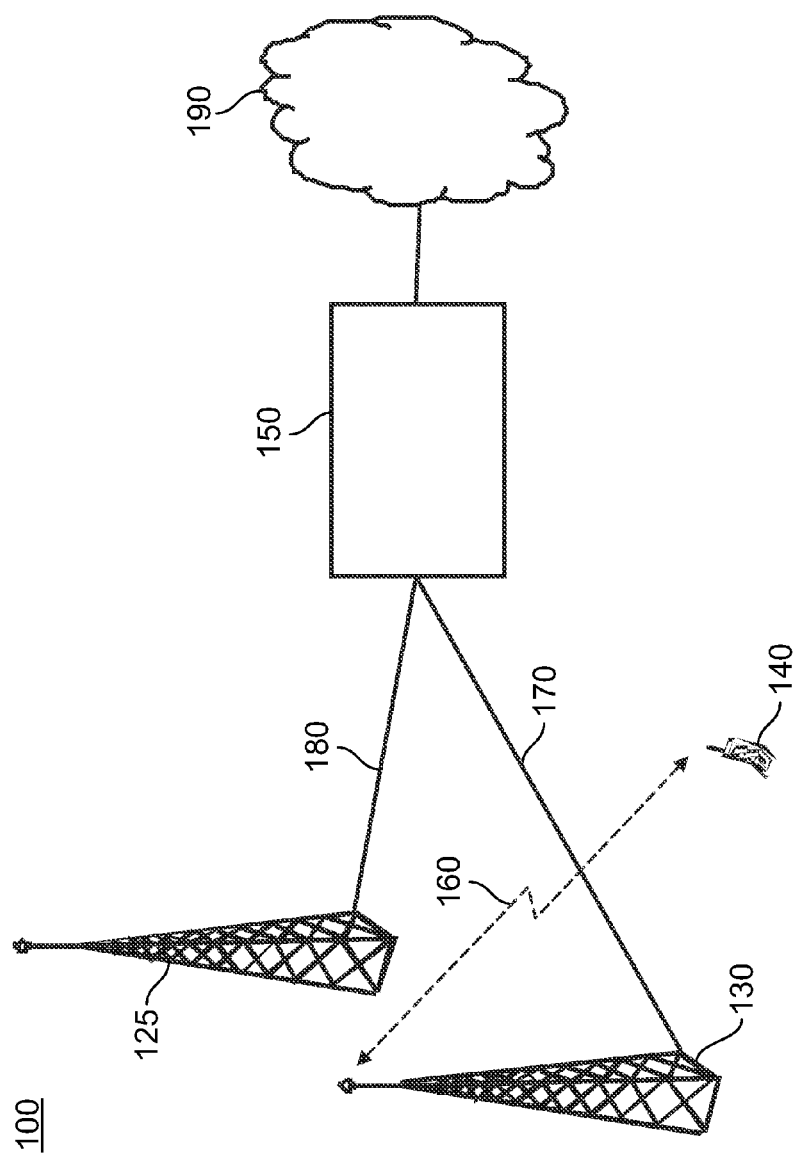
FIG. 1 is a drawing of a conceptual representation of a prior art wireless network.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

FIG. 1 is a drawing of a conceptual representation of a prior art wireless network. As depicted in FIG. 1, a wireless network (WN) 100 may comprise multiple base stations (BSs) 125, 130, multiple mobile stations (MS) 140, and a Network Controller (NC) 150. The MS 140 may connect wirelessly to one or more of the BSs 125, 130 via a radio frequency (RF) channel 160, which may allow for bidirectional transmission of voice or data between the MS 140 and the BSs 125, 130. Information from the BSs 125, 130 may then be routed to the NC 150 over fixed backhaul links 170, 180. NC 150 may provide further connectivity to the classical (non-wireless) telephony and data networks 190.

A BS 125, 130 comprised in the WN 100 may serve a certain geographic area, with a typical coverage distance of the order of a mile. A WN 100 covering an area of a larger city may comprise thousands of BSs 125, 130. Handoff (HO) is a procedure that enables the MS 140 to keep continuous voice or data transmission when moving out of the coverage area of one BS 125, 130 and into the coverage area of another BS 125, 130.

To facilitate handoffs, most modern wireless network rely on a Mobile Assisted Handoff (MAHO) procedure, whereby the MS 140 measures certain BS-specific signals (known as pilot signals or reference signals) that are constantly available from all BSs 125, 130. A typical WN 100 may have up to a few hundred distinct reference signals, depending on the specific technology and application.

Throughout the connection, the MS 140 searches for the pilot signals coming from the surrounding BSs 125, 130.

After detecting the pilot signals, the MS 140 measures their characteristics (for example, power, signal-to-noise ratio, distance, and the like) and reports the measurement results back to the WN 100 via special MAHO measurement messages.

Based on these measurements, an entity within the NC 150 may decide at some point that a new BS 125 ("Target") is likely to provide better service than the current BS 130 ("Source" BS), and may initiate an HO execution to switch to the Target BS 125. This HO process normally starts with the NC 150 informing both BSs 125, 130 about the HO decision, via special messages over backhaul links 170, 180. The source BS 130 then sends to the MS 140 all the information required for setting up a new RF channel 160 on a Target BS 125, and the Target BS 125 establishes a new RF channel 160 for the MS 140. The MS 140 then switches to the new RF channel 160 at the Target BS 125. After the Target BS 125 detects the transmissions of the MS 140 on the new RF channel 160, it informs the NC 150 about the successful HO, after which the old RF channel 160 at the Source BS 130 may be released.

In a WN 100 covering larger areas, the MS 140 needs to provide MAHO measurements for signals coming from hundreds of different BSs 125, 130, which is not feasible. To overcome this issue, wireless technologies use the local RF environment information, commonly referred to as a Neighbor List (NL, not shown), which is sent to the MS 140 by the use of special messaging over the RF channels 160. An NL specific to the Source BS 130 itemizes the identifying characteristics of the pilot signals from all BSs that are likely HO candidates within its coverage area. A typical NL contains up to a few tens of potential HO candidates, some adjacent to the Source BS 130 but many that are not adjacent to the Source BS 130. In commercial networks, due to RF propagation peculiarities, quite distant BSs can be valid HO candidates.

If a valid HO candidate BS 125 omitted from the NL at the Source BS 130, then, depending on the technology, the MS 140 has a diminished chance or no chance to detect the omitted HO candidate BS 130 as an HO candidate. Further, even when the MS 140 can detect and subsequently report the reference signal of the candidate BS 125 that is not included in the NL, in operational networks, the NC 150 cannot guess to which physical BS the omitted reference signal actually belongs, because a few dozen different BS's often share that same reference signal. The reason for this is that in most WNs 100, the number of BSs served by one NC is normally much larger than the number of available cell-specific reference signals.

If the needed HO to the neighboring BS 125, 130 cannot be executed for either of these two reasons, calls may experience deteriorated quality due to unnecessary interference, and could ultimately be dropped. Missed HOs could also cause extra interference to the other calls in the proximity of the Source BS 130, diminishing their quality and negatively impacting the WN 100 capacity in the area.

In addition to the problem of missing neighbors, existing neighbor lists may suffer from inaccuracies such as pilot misassignments. For example, a target BS 125 may have been incorrectly identified in the past. For example, a mobile telephone may report a pilot as being at a distance of five miles, while the NL wrongly defined the pilot as belonging to a sector that has the same pilot and is located for example, twenty miles away from the mobile telephone or two miles away from the mobile telephone. Misassigned pilots are very dangerous for network performance because they can create excessive interference, which can cause call failure such as call drops and failed call attempts. Misassigned pilots also reduce the capacity of the WN 100 because call resources are allocated to sectors where they are not needed, and because extra power may be used in sectors different from the sector that actually comprises the real neighbor.

As another example, an MS 140 may report two or more BS's 125, 130 with the same pilot signal causing ambiguities in the identification of target BS 125. Such problems arise due to suboptimum network planning and are often called pilot reuse problems.

Pilot reuse problems should be rare in well-designed WN's 300. In practice, Pilot reuse problems do occur quite frequently, most often due to simple engineering oversights, but sometimes also due to problems with running automated pilot planning tools comprised within RF prediction tools.

Like pilot reuse problems, pilot misassignment should be rare in well-designed WN's 100, but in practice, pilot misassignment does occur quite frequently. Some pilot misassignments occur due to poor maintenance of neighbor lists, which may become particularly evident upon a change in network configuration, typically when new sites are added to the WN 100. Pilot misassignments also occur due to problems with running automated Neighbor List tools. Often such automated NL tools do not use distance criteria or power criteria to qualify and identify missing neighbors. Alternatively, automated Neighbor List tools may automatically assign a detected missing neighbor to the nearest sector with the reported pilot. This becomes particularly problematic when network sector databases are incomplete or inaccurate, a frequent occurrence. Except in a few blatant cases, misassigned pilots are also notoriously difficult to detect in live WNs 100.

Any of these inaccuracies can cause serious problems with the performance and with the capacity of the WN 100. For data rate networks such as 1xEV-DO, data rate losses may occur as misassigned sectors cause extra interference. Reductions in capacity may occur as more resources are required because of the lower data rates, resulting in wasted resources. If the misassigned sector becomes the dominant sector, the result can be extra dropped connections. A low rate of handoff completions may also result. Moreover, these inaccuracies are often difficult to recognize using currently available techniques.

Identification of the most likely candidate for a missing neighbor or for a misassigned neighbor would in general involve a maximization of the Maximum Likelihood (ML) or the sub-optimal Minimum Mean Square Error (MMSE) functions over the geographical area to find the most probable solution for each candidate, and then selecting the candidate giving one or more of the largest probability value and the smallest error value.

Implementation of the ML and MMSE approaches would in practice require precise predictions of the power levels that the MS will receive from various BS's at various locations throughout the network, which are rather difficult to obtain. The ML approach would also require use of joint statistics of distance and power measurement errors relative to predicted powers and real distances, which are seldom available. And both would have serious computational challenges, due to the need to evaluate complex mathematical expressions at many geographical points for the possible candidates.

The missing neighbor identification and neighbor list verification and updating problems as described above may in practice be resolved by using one or more of the distance and power measurements from a mobile station (MS) that reported a missing handoff (HO) candidate to the various base stations (BSs) in the network, and the calculated distances between various BSs in the wireless network.

Embodiments of the invention are capable of attributing the missing pilot signal to the correct Target BS even when it is not the candidate nearest to the Source BS. Field data suggests that the number of such cases is significant, providing an improvement over prior art.

According to additional embodiments of the invention, in cases where the distance-based criteria give more than one candidate, the most likely BS to which the missing neighbor belongs can be determined using the RF propagation conditions as the second step. At the MS, the power of the signals received from a potential candidate can be estimated based on the BS transmit power, the BS antenna type, the BS height, BS azimuth angle, BS tilt angle, BS terrain elevation, BS clutter characteristics, and the like. Then candidate power estimates may be compared to the actual reported power measurements to determine the most likely BS. Alternatively, candidate power estimates may be compared to the Source signal estimates to determine the most likely BS. Alternatively, candidate power estimates may be compared between the candidates to determine the most likely BS.

Unlike at least some prior art methods, the present method may be applied even when the calls do not end in a drop. According to embodiments of the invention, a Network Controller (NC) may identify the Target BS candidate while the call is in progress, enabling the NC to improve or save the call while in progress, and also enabling the NC to provide updates to a Neighbor List (NL) so the NL may improve or save future calls in the same area that may experience a missing pilot signal.

Figure 2:
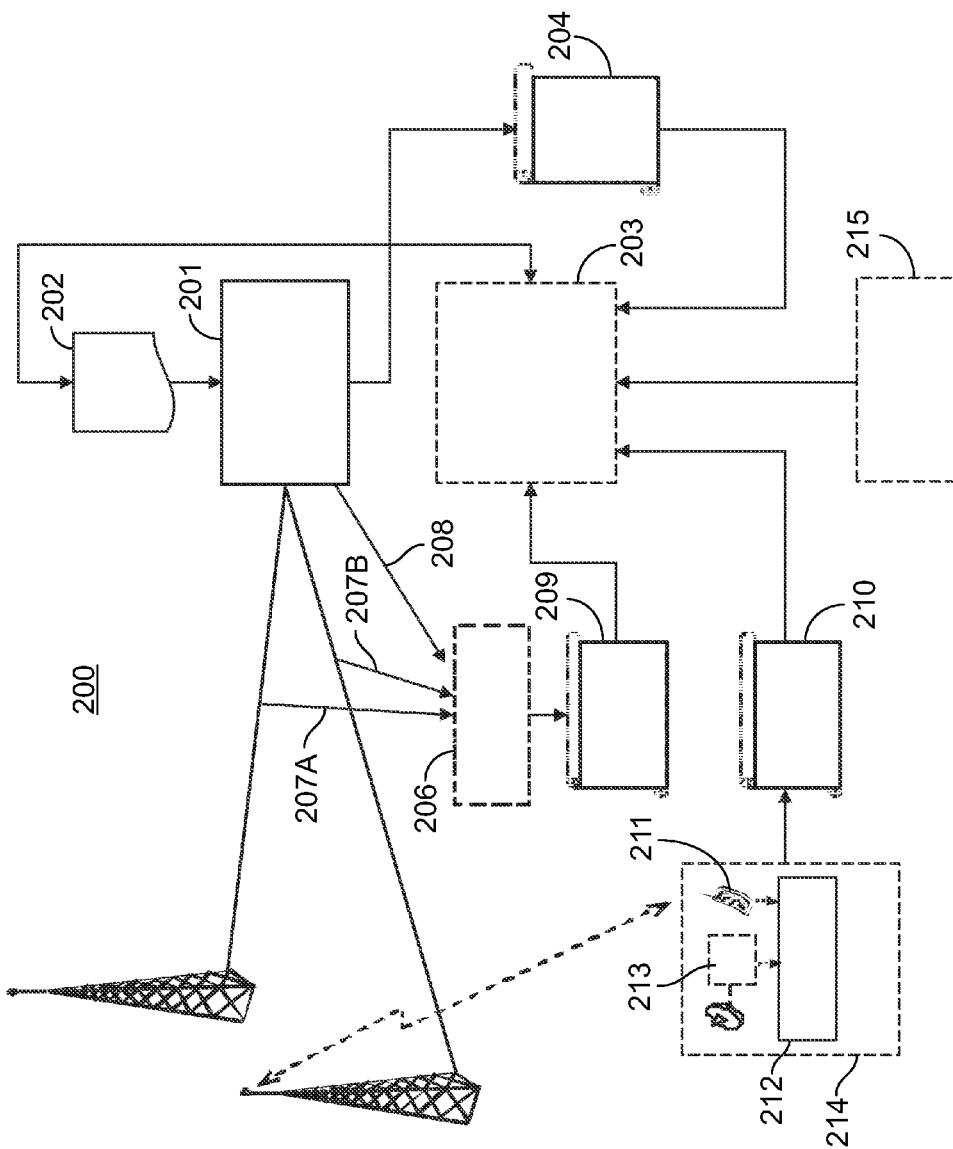
FIG. 2 is a drawing of possible embodiments of a method for identifying a missing neighbor in a wireless network.

FIG. 2 is a drawing of possible embodiments of a method for identifying a missing neighbor in a wireless network 200. The method 200 can be used to verify and update neighbor lists in a WN 200 so that such problems can be avoided for future calls in the same geographic area that experience similar RF conditions.

According to one set of embodiments, the method can be implemented by the Network Controller (NC) 201, so that no external sources of information may be required. In such a case, the NC 201 can implement the method for "live" determination of the origin of a pilot signal that is missing from the Neighbor List (NL) 202. Such a method reduces the probability of dropped calls and interference with calls already in progress. Moreover, by permitting the appropriate adjustment of the NL 202, the method can reduce the probability of dropped calls and interference on future calls.

The method can also be implemented using a separate entity not resident in the NC 201, an optional Adjunct Processor (AP) 203, in which case the results are not used for calls in progress, but are used to adjust the NLs 202 so that they can be downloaded into the NC 201 at a later time to avoid problems with future calls.

In one set of embodiments using the latter approach, the AP 203 can use Network Controller logs 204, which provide detailed information about calls. The Network Controller logs 204 comprise information about HO messages that can be used to determine the origin of the missing pilot signal. Network Controller logs 204 may be referred to as "Call Detailed Logs", "Call Detailed Records", "Per Call Measurement Data", and so on.

In yet another set of embodiments, the messages used for missing neighbor identification can be captured by optional Network Probes 206, which decode the relevant messages by passively monitoring or "sniffing" backhaul links 207A, 207B. In some cases, the Network Probes 206 capture the information by passively monitoring standardized interfaces 208 between various entities within the NC 201 itself. For example, the NC 201 may comprise one or more of a mobility manager, a gateway, a radio network, a base station controller, an operations support system, and the like. The resulting Network Probe Logs 209 are then fed into the AP 203 for further processing.

Alternative embodiments of the invention comprise Mobile Probe logs 210. One or more MS units 211 and a Probe Controller 212 are comprised within a Mobile Probe 214, whose presence in the network 200 is itself optional. Additionally, a Global Positioning System (GPS) receiver 213 may optionally be comprised within the Mobile Probe 214. Mobile Probes 214 are also variously known as Field Diagnostic Monitors and as Autonomous Wireless Probes. The one or more MS units 211 operate in a special mode in which they send the messages detected over the wireless link via a dedicated interface to the Probe Controller 212. The optional GPS receiver 213 facilitates the recording of the locations of the Mobile Probe 214 when messages arrive.

In some embodiments of the invention, the AP 203 might also use an optional Extended Sector Database 215. The Extended Sector Database 215 may contain additional information about sectors beyond the minimum set required for operation of the WN 200 and stored within the NC 201. Additional information could include the antenna types, their heights and pointing angles, geographic locations, and the like. The AP 203 can use any of these information elements in its processing.

Those of ordinary skill in the art will recognize that a combination of one or more of the inputs 204, 209 or 210, that is, a combination of one or more of the Network Controller Logs 204, the Network Probe Logs 209, and the Mobile Probe Logs 210 can be used with the disclosed method for identifying a missing neighbor in wireless networks.

Embodiments of the invention may use a Code Division Multiple Access (CDMA)-based WN 200 as described for instance by IS-95, IS-2000 (3G-1X) and IS-856 (1xEV-DO) WN 200 standards. Embodiments of the invention may be adapted to other WN 200 standards that employ mobile HO measurements, and can report the observed time differences of arrival (OTDOA) of the pilot signals. OTDOA measurements can be reported either for HO operation itself (in WCDMA or UMTS standards and its derivatives), when the OTDOA measurements are provided as an option for support of the geographic location of emergency calls (in GSM, WiMAX and Long Term Evolution [LTE]), or when the OTDOA measurements are provided as an option for support of location-based services.

Figure 3:
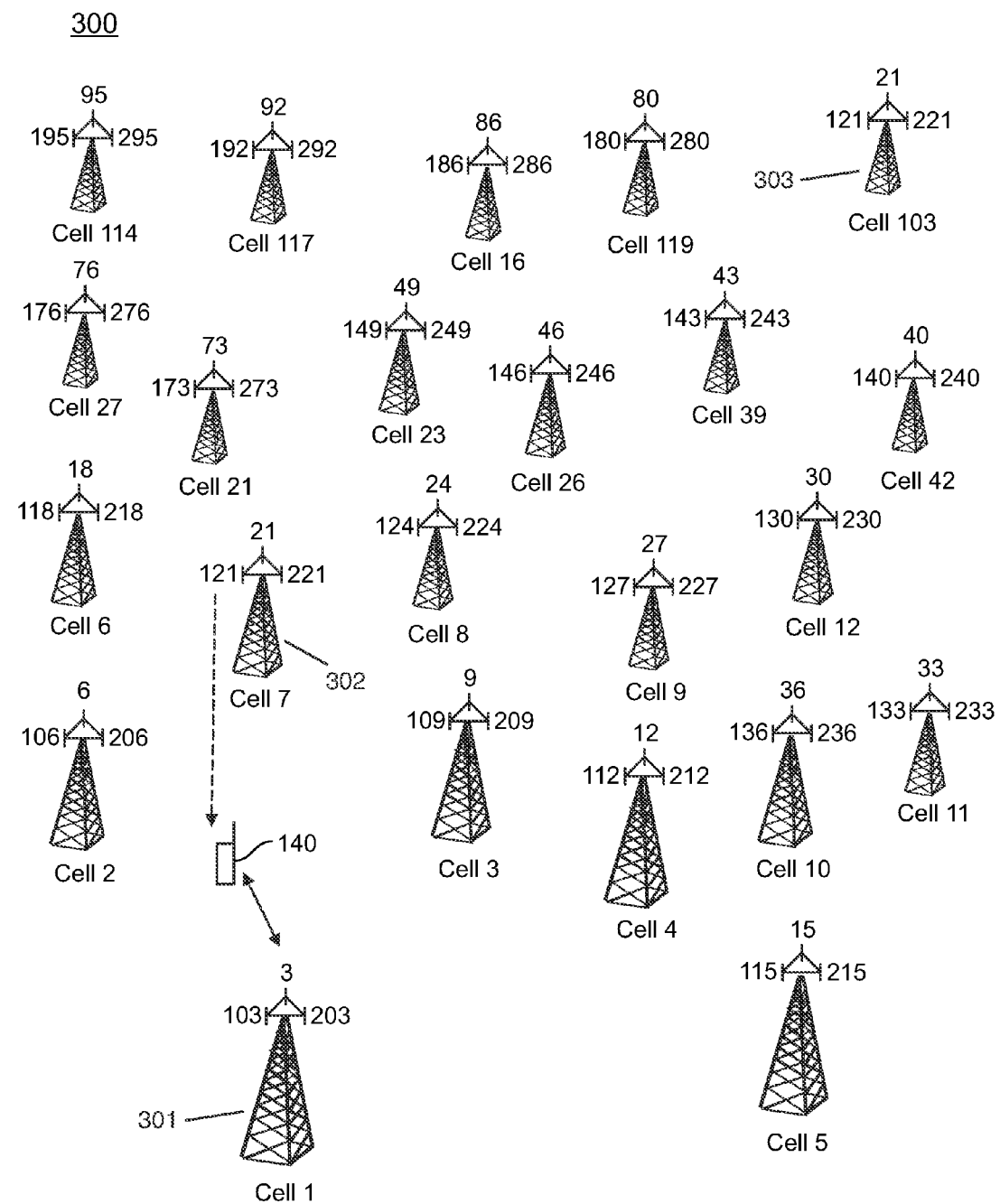
FIG. 3 is a drawing showing an example of embodiments of a method for identifying a missing neighbor in a wireless network.

FIG. 3 is a drawing showing an example of embodiments of a method 300 for identifying a missing neighbor in a wireless network 300 in a case in which a BS is split in three sectors per cell tower. In this case, the sectors cover an area within approximately a 120° angle. For example, adopting a convention of proceeding counterclockwise starting with the cell listed in the top of the triangle, cell 1 is split into sectors 1, 2, and 3 with respective PN (pseudonoise) Offsets 3, 203, and 103. The operation of the invention is not affected by the number of sectors deployed in any of the cells. Moreover, in CDMA one MS 211 may have RF channels 160 active on more than one source sector. In CDMA systems, such a situation is known as a soft handoff (SHO).

A sector comprised in a WN 300 that conforms to IS-95, IS-2000 or IS-856 standards continuously transmits one of the predefined pilot signals, which are synchronized in time using an external timing reference, for example, using GPS receivers. Up to 512 predefined pilot signals are available. Individual pilot signals may be distinguished using their PN Offsets. Networks normally use a subset of all available PN Offsets, usually selecting successive values in increments of 3, 4 or 6. For example, if the value of the PN Offset increment, known as the Pilot_Increment, is 4, then the available PN Offsets are 0, 4, 8, 12, . . . , 508, for a total of 128 unique PN Offsets. An example of possible assignment of PN Offsets in a WN 300 is also depicted in FIG. 3. An MS 211 communicating with Sector 1 on Cell 1 (301, with PN Offset=3) could report Sector 2 on Cell 7 as a possible neighbor (302, with PN Offset=121), but due to the pilot reuse problem addressed by embodiments of the invention, this same PN Offset could, as shown, also belong to Sector 2 on Cell 103 (303).

On the mobile side, a CDMA mobile station comprises a special searcher device that checks for the appearance of any new sufficiently strong pilot signals or a reduction in strength of previously detected pilot signals. When a change in pilot signal strength and/or pilot signal status occurs, the MS 211 informs an entity in the NC 201 that is responsible for the mobility management via a Pilot Strength Measurement Message (PSMM) in IS-95/IS2000, or a Route Update Message (RUM) pursuant to the IS-856 suite of standards.

Upon receiving a PSMM or RUM adding a new pilot signal, the NC 201 allocates the traffic channel at the appropriate Target sector, thus enabling the communication with the sector to which the newly detected pilot signal belongs. Upon receiving a PSMM or RUM removing a pilot signal, the NC 201 disables the traffic channels at the appropriate Target sector. A special "keep" indicator in the PSMM or the RUM specifies which of these two actions the MS 211 suggests to the NC 201.

FIG. 4 is a table that shows an example 400 of an existing neighbor list 202 for sector 1 of cell 1. Neighbor lists 202 for an individual sector in a CDMA system are stored by the system. The stored neighbor lists 202 list the pilots to be searched by the associated PN Offsets. In their PSMM or RUM reports, MS 211 units list one pilot in terms of the PN Offset. This pilot is the Reference pilot, which is used by the MS 211 as its internal timing reference. The other detected pilots are listed in terms of their Pilot_PN_Phase. The PN Offset of the i-th reported pilot may be calculated based on the Pilot_PN Phase$_i$ according to the following equation:

$$\text{PN Offset}_i = \text{nint}(\text{PilotPN\_Phase}_i/64/\text{Pilot\_Increment}) \\ *\text{Pilot\_Increment}, \quad (1)$$

where nint(X) stands for the integer nearest to the real number X. Some variations of equation (1) are possible according to embodiments of the invention, depending on how the cases are addressed in which PN Offset=0 and in which PN Offset has its maximum value.

Once the NC 201 receives a PSMM or RUM message with the list of PN_Pilot_Phase values and pilot strength measurements Ec/Io, it determines the PN Offsets using equation (1). The NC 201 then looks up the Source sector in the NL 202. A sample NL is depicted in FIG. 4. Via the lookup, the NC 201 determines to which cell and sector the PN Offset belongs, thereby enabling the addition or release of the corresponding traffic channel. For instance, if the source is sector 1 on cell 1, and a PN_Pilot_Phase reported by the MS 211 translates using equation (1) into a PN Offset=209, from the NL 202 in FIG. 4 the NC 201 would recognize that this entry corresponds to cell 3 in target sector 2, cell 401. The NC 201 then turns the traffic channel on or off, depending on the "keep" indication and the reported pilot strength Ec/Io.

If, on the other hand, the MS 211 reports the pilot from cell 7 in sector 2, its PN_Pilot_Phase is calculated using equation (1) to give PN Offset=121. Since the NC 201 cannot find this value in the NL 202 for the Source sector from FIG. 4, it would not know at which Target cell and sector to perform the required traffic channel operation. Accordingly, this case is an example of a missing neighbor. This case of a missing neighbor can be addressed according to embodiments of the invention. Note that in FIG. 3 there were two candidate sectors in the general vicinity of the source Sector 1 on Cell 1 that have PN Offset=121, Sector 2 on Cell 7 (302) and Sector 2 on Cell 103 (303). In the whole WN 300, the number of sectors for which PN Offset=121 could easily be a few dozen.

FIG. 5 is a flowchart showing the steps in a method 500 for identifying a missing neighbor in a wireless network.

In step 510, a report is received about two or more pilot signals measured by a mobile station.

In step 520, it is determined that one or more of the reported pilot signals is a missing neighbor not comprised in a current neighbor list of the mobile station.

In step 530, one or more candidate sectors having a pilot signal with the same pilot identity as the missing neighbor are chosen.

In step 540, a most likely sector is selected as the missing neighbor from the one or more candidate sectors, based on calculated distances between the mobile station and a source sector, between the mobile station and at least one of the one or more candidate sectors, and between the source sector and at least one of the one or more candidate sectors, so as to identify the missing neighbor in the wireless network.

This step can further comprise selecting as a most likely sector a candidate sector for which a triangle inequality is satisfied to within a predetermined tolerance level, in order to accommodate random measurement errors.

This step can further comprise selecting as a most likely sector a candidate sector for which a triangle inequality is approximately satisfied by the distance between the mobile station and a source sector, the distance between the mobile station and the candidate sector, and the distance between the source sector and the candidate sector.

Certain embodiments may include an additional step of estimating power levels received at an estimated mobile station location from the missing neighbor and from the one or more candidate sectors.

Further embodiments may include an additional step of using the candidate sector power levels and the missing neighbor power levels to select a most likely sector.

Other embodiments may include an additional step of estimating a power level received from the source sector at the estimated mobile station location.

Still other embodiments may include an additional step of calculating the relationships between the candidate sector power levels relative to the source sector power level.

Certain embodiments may include an additional step of estimating the power level from the source sector and comparing relative values of the source vs. candidates power estimates with the relative source vs. missing neighbor power levels as reported by the mobile station.

Certain embodiments may include an additional step of transferring, by the adjunct processor, an updated neighbor list to the network controller.

Figure 6:
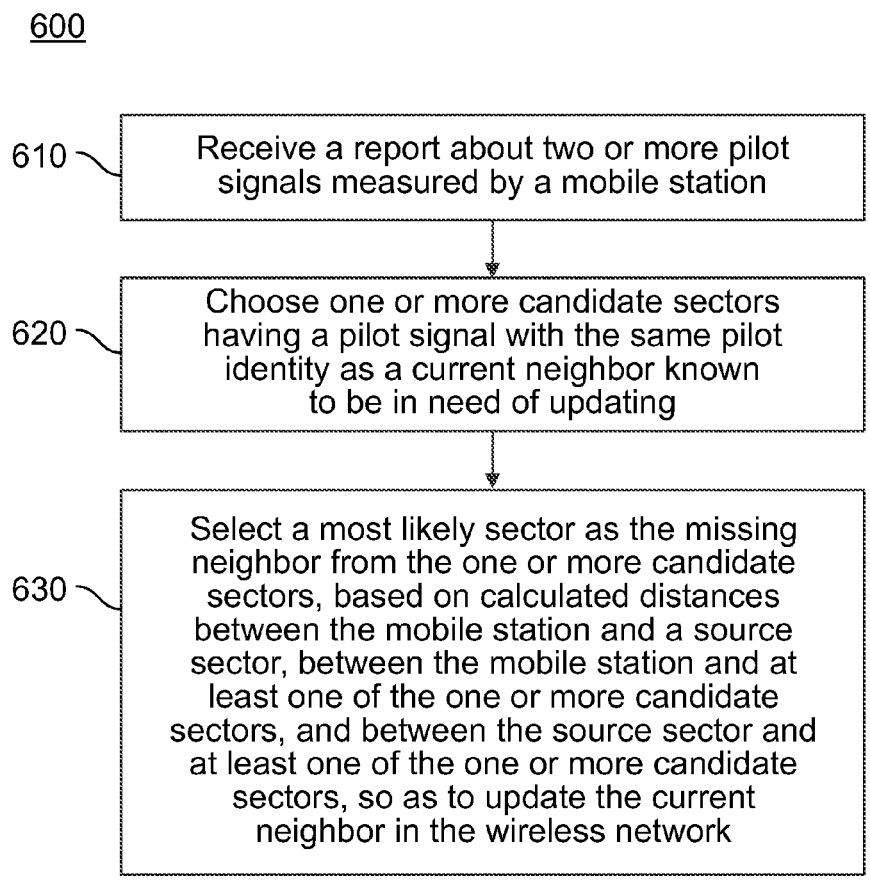
FIG. 6 is a flowchart showing the steps in a method for updating a current neighbor in a wireless network.

FIG. 6 is a flowchart showing the steps in a method 600 for updating a current neighbor in a wireless network.

In step 610, a report is received about two or more pilot signals measured by a mobile station.

In step 620, one or more candidate sectors are chosen having a pilot signal with the same pilot identity as a current neighbor comprised in a current neighbor list.

In step 630, for the current neighbor, a most likely sector is selected from the one or more candidate sectors, based on calculated distances between the mobile station and a source sector, and between the mobile station and at least one of the one or more candidate sectors, so that the current neighbor that was previously misidentified can be detected and updated.

This step can comprise determining that two or more candidate sectors qualify as most likely sectors.

This step can further comprise determining the presence of a pilot reuse problem.

This step can further comprise transmitting an appropriate notification that two or more candidate sectors qualify as most likely sectors.

This step can further comprise transmitting an appropriate notification of a pilot reuse problem.

Figure 7:
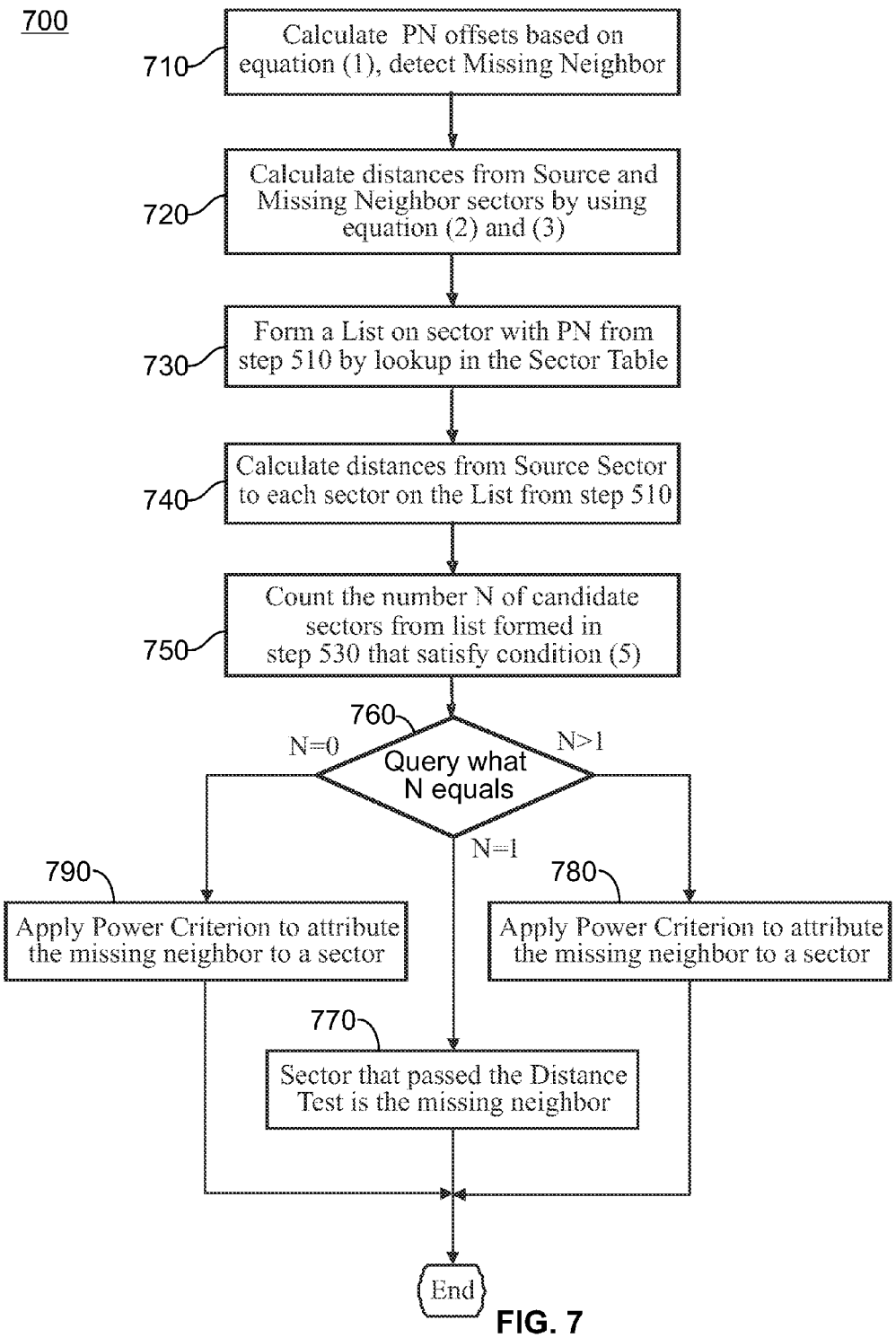
FIG. 7 is a flowchart showing the steps in a method for identifying a missing neighbor in a CDMA wireless network using a distance-based condition.

FIG. 7 is a flowchart showing the steps in a method 700 for identifying a missing neighbor in a Code Division Multiple Access (CDMA) wireless network using a distance-based condition.

In step 710, one of the NC 201 and the AP 203 detects that the received PSMM or RUM message contains a missing pilot. This step comprises calculating the PN Offset using equation (1) and the reported Pilot_PN_Phase. This step preferably comprises comparing the reported PN Offset with the PN Offsets listed in the Source sector NL 202. In embodiments in which the method is implemented in the NC 201, this step is performed anyway. In embodiments in which the method is implemented in the Adjunct Processor, the Adjunct Processor can carry out this step since the messages containing the NL 202 are sent after a successful HO.

In step 720, one of the NC 201 and the AP 203 calculates the OTDOA of an i-th non-reference pilot relative to the Reference pilot as follows:

$$OTDOA_i = (\text{Pilot\_PN\_Phase}_i - \text{PN\_Offset}_i \times 64) \times 0.8138 \cdot 10^{-6} \quad (2)$$

because the Pilot_PN_Phase is reported in units of 1/1.2288 microseconds (one CDMA "chip" interval).

The RF path distance difference seen by the MS 211 between a non-reference sector and the reference sector can be calculated by multiplying the OTDOA values by the speed of electromagnetic radiation. The calculated RF path distances can be slightly larger than the actual distances traversed, due to multipath propagation resulting from refractions and reflections of the RF waves; but in practice, they tend to be quite close. The strengths of the detected pilots are reported as a ratio of the measured pilot power to the total received power, analogous to the ratio Ec/Io of signal to signal-plus-interference-plus-noise.

For embodiments of the invention using CDMA technology, at least one of the Source sectors involved in the SHO measures and reports back to the NC 201 the Round Trip Time (RTT). RTT refers to the time difference between a signal's direct transmission time and the transmission time of the signals received from the MS 211 on the return RF link. The RF path distance between the Source sector and the MS 211 reporting the pilots can then be calculated by multiplying one-half of the RTT time by the speed of electromagnetic radiation, giving a result that will again be very close to the actual on-the-ground distance.

By adding the RF path difference measurements calculated from the $OTDOA_i$ reports as described above, the NC 201 or the AP 203 can determine the distances $Dist_{sector_i-MS}$ between the MS 211 and any Source sector or Candidate sector. In the case of an i-th sector, assuming that the RTT measurement $RTT_j$ is available from a different j-th sector, this distance can be calculated as follows:

$$Dist_{sector_i-MS} = (RTT_j/2 + OTDOA_i - OTDOA_j) \times c, \quad (3)$$

where c stands for the speed of the electromagnetic RF waves.

In step 730, the NC 201 or AP 203 searches the list of all sectors in the WN 300 and forms a new List of Candidate sectors that have the same PN Offset as the value calculated for the missing neighbor.

For a sector comprised in the WN 300, the network database comprises cell and sector identification numbers, the associated PN Offsets, and the associated geographic coordinates. All this information is already present in databases in any NC 201 utilizing CDMA technology under the IS-95, IS-2000 or IS-856 suite of standards, sector latitude and longitude being used for distance-based registration procedures. The information is available to the AP 203 via an interface to the NC 201, or from an external source (for example, extended sector database 215 in FIG. 2) if a direct interface is not supported.

In step 740, using formulas from the field of geometric geodesy, the NC 201 or AP 203 calculates the distances $Dist_{Source-Candidate}$ between the Source Sector and a sector from the List of Candidates created in step 730.

In step 750, at least one sector from the List of Candidate sectors is tested using the following equation to verify if the following distance condition is met:

$$(Dist_{Source-MS} - Dist_{Candidate-MS})^2 \leq (Distance_{Source-Candidate})^2 \leq (Dist_{Source-MS} + Dist_{Candidate-MS})^2 \quad (4)$$

Condition (4) is one form of the triangle inequalities from elementary plane geometry, stating that one side of a triangle is shorter in length than the sum of the lengths of the other two sides, and that one side of a triangle is longer in length than the difference of the lengths of the other two sides. Condition (4) ensures the intersection of the circles centered on the Source and candidate sector and having radii corresponding to the calculated distances between these two sectors and the MS 211. The MS 211 will be located at one of the up to two possible intersection points. Those skilled in art will recognize that numerous other forms of triangle inequalities mathematically equivalent to (4) are also applicable.

For calculations of $Dist_{Candidate-MS}$, inaccuracies can occur due to finite quantization of Pilot_PN_Phase and of RTT measurements, possible multipath conditions, stochastic errors due to noise and interferences, and the like. For calculations of $Distance_{Source-Candidate}$, inaccuracies can be attributed to rounding errors and to errors in population of the geographical coordinates. For practical implementation of embodiments of the invention, it may be convenient to somewhat relax the strict requirements of condition (4) to compensate for these possible inaccuracies in the calculated distances by applying one or more of an additive or multiplicative tolerance factor. For example, use of an additive factor would modify condition (4) as follows:

$$(Dist_{Source-MS} - Dist_{Candidate-MS})^2 - \epsilon^2 \leq (Distance_{Source-Candidate})^2 \leq (Dist_{Source-MS} + Dist_{Candidate-MS})^2 + \epsilon^2 \quad (5)$$

where $\epsilon$ is a small constant whose value depends on the accuracy of the measurements.

In the case of SHO with two or more geographically distinct sectors, the conditions (4) or (5) for selecting a valid candidate have to be simultaneously met by all Source sectors, a condition that may be used as an additional qualification of the Candidate sectors.

In step 750, the number N of candidate sectors that pass the distance test is counted.

In step 760, it is queried how many candidate sectors pass the distance test, that is, it is queried what N equals. In most well-designed networks, out of all the potential Candidates on a list of candidates, only one sector satisfies the distance condition (5), in which case, N=1, and the process proceeds to step 770.

In step 770, the sector missing on the Source sector NL 202 is identified. Normally, the uniqueness of the missing neighbor Candidate is ensured by the PN Planning process, in which the designers and operators of the WN 300 assign the PN Offsets to the individual sectors in such a way that the sectors with the same PN Offset are sufficiently far apart geographically.

For various practical reasons, cases in which the PN planning process does not resolve a unique candidate for the missing neighbor do occur in commercial networks. In such cases, the answer to the question posed in step 760 is N>1, and the process proceeds to step 780. In step 780, using RF power propagation criteria, the NC 201 or AP 203 determines which of the candidates that satisfy condition (5) is the right one.

If the answer to the question posed in step 760 is N=0, the process may proceed to step 790. Algorithmically, this step may be similar to step 770 (determination of number of candidates based on RF power propagation criteria), except that these criteria would not be applied to the set of cells that satisfy the distance criteria from step 750, but would be applied to the original set of cells from step 730.

As outlined above in FIG. 6, another problem that can be addressed using the method disclosed in FIG. 7 is updating of PN misassignments in existing neighbor lists 202.

For applications involving verification and updating of existing neighbor lists 202, possible PN reuse problems arise when more than one of the sectors within the WN 300 satisfies the distance criterion from condition (4) or condition (5). In these cases, the existence and severity of the potential problem can be estimated using a power-based criterion as discussed below in FIG. 8.

Figure 8:
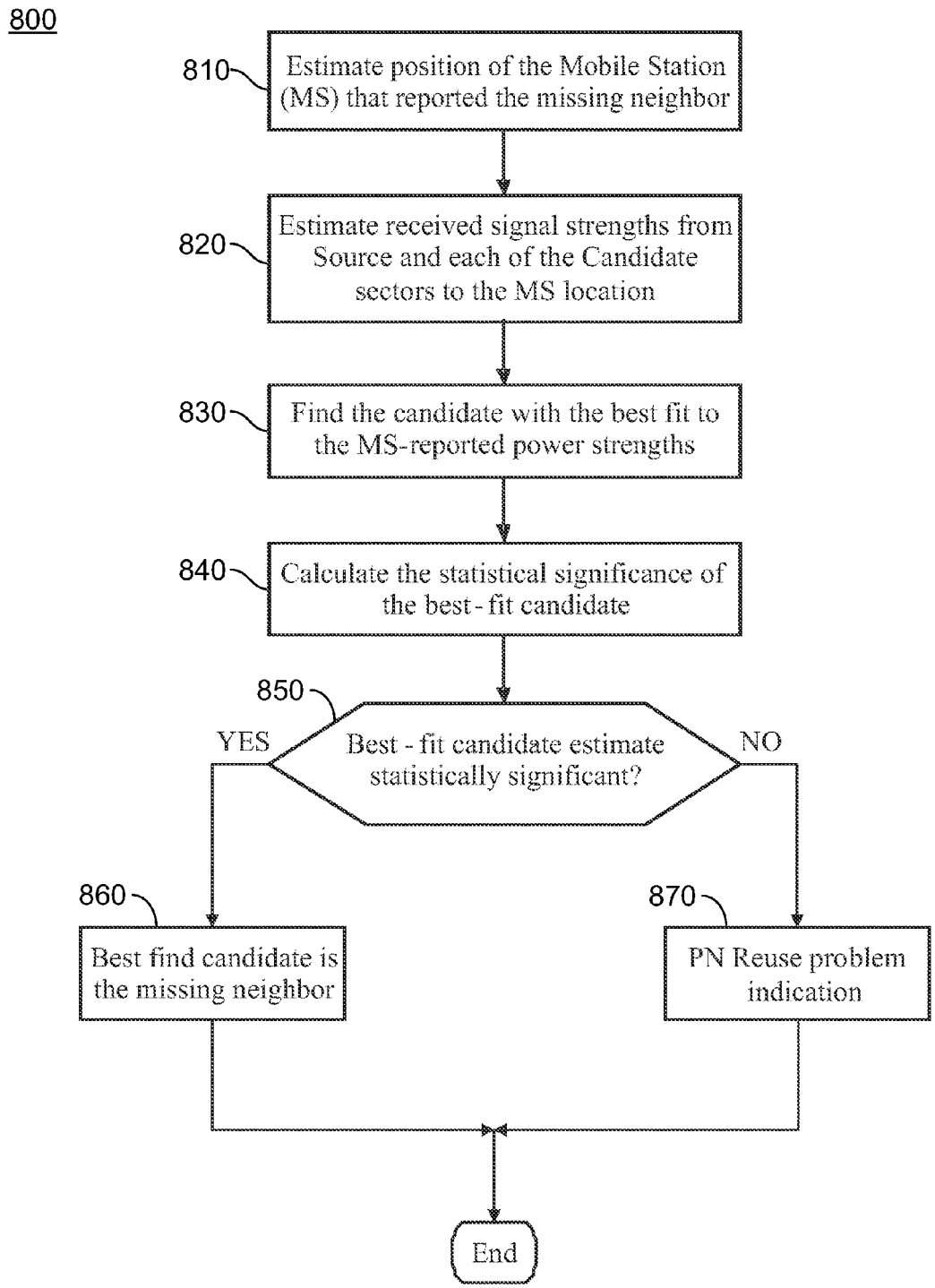
FIG. 8 is a flowchart showing the steps in a method for identifying a missing neighbor in a CDMA wireless network using a power-based condition in a case where more than one candidate satisfies the distance-based condition.

FIG. 8 is a flowchart showing the steps in a method for identifying a missing neighbor in a Code Division Multiple Access (CDMA) wireless network using a power-based condition in a case where more than one candidate satisfies the distance-based condition.

In step 810, the NC 201 or AP 203 the estimates the location of the MS 211 at the time when it reported a missing pilot in the PSMM or RUM messages. Estimation of the most likely location can be accomplished in a number of different ways, depending on the particular application. For instance, the information might be comprised in the Mobile Probe logs (item 210 in FIG. 2) generated from the GPS measurements. Location information might be available in the NC 201 if the network support for Location Based Services is active, as specified, for example, by the IS-801 suite of standards. Alternatively, trilateration techniques can be used to make one or more location estimates, depending on the number of Source servers active. For the purposes of the disclosed method, it will normally be sufficient to estimate the distance $Dist_{Source-MS}$ as equal to the distance measured along the boresight of the strongest Source sector.

In step 820, the power levels received from the Source and Candidate servers at the expected location of the MS 211 are estimated. This can be done by interfacing with an RF propagation prediction tool such as, for example, Atoll, Planet, and the like.

In many situations, especially where PN reuse planning is done carefully, very good results can be obtained by starting with the pilot transmit power from the Extended Sector Table, an example of which is shown in FIG. 13. The sector antenna gains can then be evaluated by geometric calculations for the azimuth and elevation angles from the location of the MS 211 to the sector, by a lookup in the sector antenna pattern database, or by using a standard parabolic approximation based on horizontal and vertical antenna beamwidths taken from the Extended Sector Table, an example of which is shown in FIG. 13. The propagation path loss from a Source or Candidate antenna can be approximated by one of several semi-empirical models, such as, for example, the Okumura-Hata model:

$$K-13.82 \cdot \log_{10}(Height_{Sector}) + (44.99 - 6.55 \cdot \log_{10}(Height_{Sector})) \cdot \log_{10}(Dist_{Sector-MS}) \quad (6)$$

where K is a constant that depends on the frequency of the RF channel 160, clutter morphology, and assumed MS 211 antenna height. By adding the sector antenna gains to the pilot transmit powers and subtracting the calculated path loss, accurate estimates can be made of the power received by the MS 211 from the various Source and Candidate sectors.

Once the received power estimates are calculated, in step 830 they are compared to the power level ratios as reported by the MS 211 via the MAHO messages (PSMM or RUM), and the sector with the best fit is determined. A number of different best fit determination algorithms are possible. For example, the best fit determination algorithm can comprise finding a candidate with the ratio of power difference vs. Source sector power that is closest to the ratio of the source's reported power and the missing neighbor's reported power. Alternatively, the best fit determination algorithm can comprise finding a candidate with the strongest received power, since the probability of having two candidates of comparable power is typically very small in a WN 300 with a reasonable level of PN reuse planning. Other approaches to a best fit determination algorithm are also possible according to embodiments of the invention.

In step 840, the statistical significance of the best-fit match is evaluated. A number of different methods for determining the statistical significance of the best-fit match are possible, depending on the details of the best-fit algorithm used in step 830. For example, the statistical significance evaluation can comprise determining the standard deviation of the estimation error of the path loss model used due to shadowing as well as determining the correlation between shadowing processes as experienced by different sectors. In the Okumura-Hata case, this standard deviation will typically be approximately 6-8 dB. A typical value for the correlation between shadowing processes is approximately 0.5.

Where the sector with the strongest received power is picked as the most likely candidate, the statistical significance can be determined based on the power difference between the strongest candidate and the second strongest candidate. It is queried whether the best-fit candidate is statistically significant. This question can be formulated as a query as to whether the statistical difference exceeds a value of X dB, where X is a function of the shadowing standard deviation, the correlation between shadowing processes on different sectors, and the required confidence level (say 95 or 99%).

If the best fit candidate estimate is statistically significant, then the process proceeds to step 860. In step 860, the candidate with the strongest power is declared to have the best fit.

If the answer to the question posed in step 850 is that the best fit candidate estimate is not statistically significant, then the process proceeds to step 870. In step 870, an indication is generated of a possible pilot PN Reuse problem.

According to an alternative set of embodiments, the Power condition shown in FIG. 8 can be used in step 790 of FIG. 7 if step 770 using the Distance condition as shown in FIG. 7 does not generate any likely candidates.

FIG. 9 is a table that shows a portion of a wireless network cell and sector database 900. One of the NC 201 and AP 203 searches the list of all sectors in the WN 300 and forms a new List of Candidate sectors that have the same PN Offset as the value calculated for the missing neighbor. The three highlighted sectors are those that have a missing neighbor value PN_Offset=121.

FIG. 10 is a table that shows an example 1000 of a distance calculation for candidate sectors with the same PN offset and different latitudes and longitudes in a method for identifying a missing neighbor in a CDMA wireless network pursuant to step 740 in FIG. 7.

Figure 11:
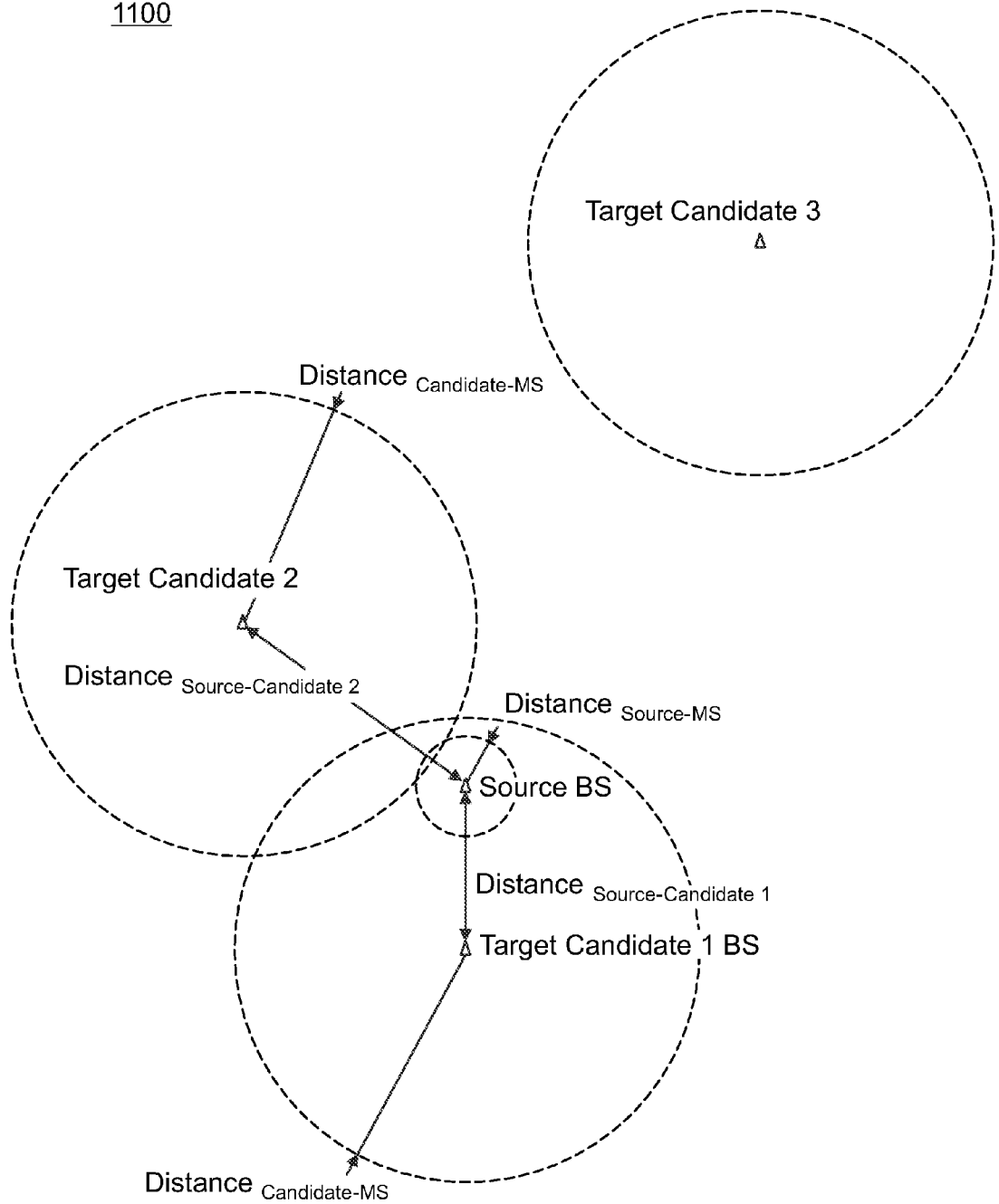
FIG. 11 is a drawing schematically illustrating a method for identifying a missing neighbor in a wireless network when the missing neighbor does not belong to the nearest candidate sector.

FIG. 11 is a drawing schematically illustrating a method 1100 for identifying a missing neighbor in a wireless network when the missing neighbor does not belong to the nearest candidate sector pursuant to step 740 in FIG. 7. As shown in FIG. 11, condition (4) ensures the intersection of the circles centered on the Source and candidate sector and having radii corresponding to the calculated distances between these two sectors and the MS 211. These three candidates have the same PN offset. The MS 211 will be located at one of the up to two possible intersection points.

As mentioned above in regards to step 780 in FIG. 7, while rare, cases in which the PN planning process does not resolve a unique Candidate for the missing neighbor do occasionally arise.

Figure 12:
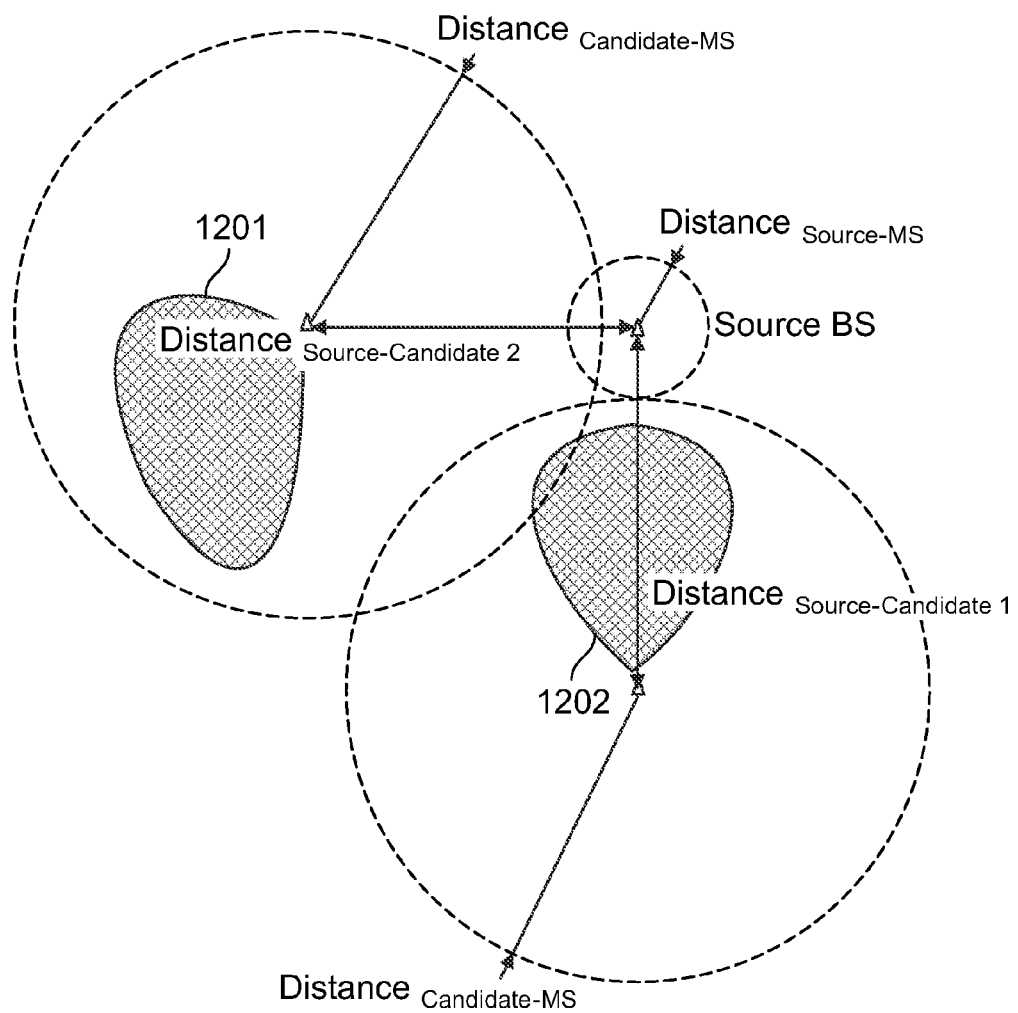
FIG. 12 is a drawing schematically illustrating a method for identifying a missing neighbor in a wireless network using a power-based condition in a case in which the distance-based condition gives more than one valid candidate.

FIG. 12 is a drawing schematically illustrating a method 1200 for identifying a missing neighbor in a wireless network using a power-based condition in case the distance-based condition gives more than one valid candidate. The actual antenna radiation patterns 1201, 1202 of the two candidate sectors are superimposed. Although both sectors satisfy the distance condition (5), the missing neighbor pilot is more likely to come from Candidate sector 1 than from Candidate sector 2. This is due to the fact that Candidate sector 2 sector points away from the source sector, and accordingly is much less likely to be present at a sufficient power level in the general area where the MS 211 is located. Another possible clue is that either of the other two sectors from the cell with Candidate sector 2 would likely be active as Source sectors if it were a real candidate.

To implement a Power-based condition in cases in which the calculation in step 740 of FIG. 7 of the distance condition (5) gives multiple candidates, the NC 201 or AP 203 can use an Extended Sector Database, such as item 215 in FIG. 2.

FIG. 13 is a table 1300 showing a portion of such a wireless network cell and sector database ("Extended Sector Database") that can be used in the received power calculations according to embodiments of the invention.

FIG. 13 comprises information about cell number, sector number, PN offset, latitude and longitude, deployed antenna types in the sectors, their azimuth pointing angle and tilts, heights, pilot power, horizontal antenna beamwidth, vertical antenna beamwidth, and the like. Such information is relevant for RF propagation but is not always stored at the NC 201. Typically, such information is readily available in network construction databases or in databases for propagation prediction that are used in design and optimization of WNs 300, with which the AP 203 or NC 201 can easily interface.

According to alternative sets of embodiments, the method can be applied in Universal Mobile Telecommunications System (UMTS) networks using W-CDMA technology. According to these sets of embodiments, a pilot signal comprises a scrambling code, pilot measurements are comprised in a Radio Resource Control (RRC) Measurement Report, and missing pilots are listed in a Detected Set.

According to these sets of embodiments, the time differences of arrival as measured by the mobiles (OTDOA) may be reported in terms of Chip and Frame Offsets via RRC Measurement Report messages.

According to alternative sets of embodiments, in the case of UMTS networks with synchronous cells, the methods disclosed above can be adjusted to account for a different Chip Offset definition and a different chip duration. Examples of such UMTS networks include Time Division Duplex (TDD) networks and Frequency Division Duplex (FDD) networks. In the case of unsynchronized FDD networks, the network can measure or otherwise determine the Relative Timing Differences (RTDs) between different base stations. The RTDs can be sent over the air to the mobiles, via RRC Measurement Control messages, in which case embodiments of the invention may use logs from the network or mobile probes.

According to another alternative set of embodiments, in an unsynchronized UMTS network, RTD values can be estimated from mobile telephones' RRC Measurement Report messages listing multiple pilots, as described in the literature. No additional information is needed from the side of the WN 301 in order to estimate the RTD values. The estimation will typically be performed by embodiments comprising an adjunct processor 203.

Alternatively, RTD values can be obtained from measurements by mobile telephones at known locations. For example, special test mobile telephones could be strategically distributed throughout the WN 300 for the purpose of facilitating such measurements.

According to alternative sets of embodiments, the method can be applied in LTE networks. According to these sets of embodiments, a pilot signal comprises a Physical Cell Identifiers (PCI), pilot measurements are comprised in a Radio Resource Control (RRC) Measurement Report, and missing pilots are listed in a Detected Set.

In LTE, the methods proposed herein can be applied directly when the OTDOA measurements are provided to support emergency calls (e911) or calls with location-based services enabled, and the same would apply for other technologies with no OTDOA measurements included in standard handoff messages, such as GSM, WiMAX, etc.

In LTE, the OTDAO measurements are generally not available in RRC Measurement Reports, but the distance from the serving cell can still be calculated based on the measured RTT values, and distance estimates based on reported powers can also be used within the same basic methodology proposed herein, Estimation of distances based on reported power levels can be carried out using path loss formulas such as the Okumura-Hata model (6). Various other approaches to distance estimation based on the received powers (or e.g. one measured RTT value and differences of the reported powers), are well described in the literature.

While the above representative embodiments have been described with certain components in exemplary configurations, it will be understood by one of ordinary skill in the art that other representative embodiments can be implemented using different configurations and/or different components. For example, a mathematically equivalent triangle inequality could be substituted for condition (2) without substantially affecting the operation of the invention. For example, for embodiments of the invention whereby missing neighbor identification or verification and updating of neighbor lists employs a mobile probe log 210, the locations directly identified by the associated GPS receiver 213 can be used without substantially affecting the operation of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. A method for identifying a missing neighbor in a wireless network, comprising:
  receiving a report about two or more pilot signals measured by a mobile station;
  determining that one or more of the reported pilot signals is a missing neighbor not comprised in a current neighbor list of the mobile station;
  choosing one or more candidate sectors having a pilot signal with the same pilot identity as the missing neighbor; and
  selecting a most likely sector as the missing neighbor from the one or more candidate sectors, based on calculated distances between the mobile station and a source sector, between the mobile station and at least one of the one or more candidate sectors, and between the source sector and at least one of the one or more candidate sectors, so as to identify the missing neighbor in the wireless network.

2. The method of claim 1, wherein the method is performed by a network controller.

3. The method of claim 1, wherein the method is performed by an adjunct processor not comprised in a network controller.

4. The method of claim 1, wherein the step of receiving is performed using one or more of a network controller log, network probe logs, a mobile probe log, and an extended sector database.

5. The method of claim 1, wherein the step of selecting comprises selecting as a most likely sector a candidate sector for which a triangle inequality is satisfied to within a predetermined tolerance level.

6. The method of claim 5, further comprising:
  estimating candidate sector power levels received from the one or more candidate sectors at an estimated mobile station location;
  comparing candidate sector power levels to a missing neighbor power level received from the missing neighbor at the estimated mobile station location; and
  using the candidate sector power levels and the missing neighbor power level to select a most likely sector.

7. The method of claim 6, further comprising:
  estimating a source sector power level received from the source sector at the estimated mobile station location; and
  calculating the relationships between the candidate sector power levels relative to the source sector power level; and
  using the candidate sector power levels, the missing neighbor power level, and the source sector power level to select a most likely sector.

8. The method of claim 1, wherein the wireless network is a Code Division Multiple Access (CDMA) network, wherein the pilot identity is a PN (Pseudonoise) Offset, and wherein the distances are calculated based on at least one of Round Trip Time information and pilot PN phase information from the Pilot Strength Measurement or Route Update messages.

9. The method of claim 1, wherein the wireless network is a Universal Mobile Telecommunications System (UMTS) network, wherein the pilot identity is a Scrambling Code, and wherein the distances are calculated based on at least one of Round Trip Time information obtained from a Radio Resource Control (RRC) Measurement message and chip and frame offset information obtained from an RRC Measurement message.

10. The method of claim 9, wherein the UMTS network is unsynchronized, further comprising the step of computing the distances between the source sector and at least one of the one or more candidate sectors based on Relative Timing Differences (RTDs).

11. The method of claim 1, wherein the wireless network is a Long Term Evolution (LTE) network, and wherein the pilot identity is a Physical Cell Identifier (PCI), and distances are calculated based on RTT and power measurements from the RRC Measurement Report message.

12. A method for updating a current neighbor in a wireless network, comprising:
  receiving a report about two or more pilot signals measured by a mobile station;
  choosing one or more candidate sectors having a pilot signal with the same pilot identity as a current neighbor comprised in a current neighbor list; and
  for the current neighbor, selecting a most likely sector from the one or more candidate sectors, based on calculated distances between the mobile station and a source sector, between the mobile station and one or more candidate sectors, and between the source sector and at least one of the one or more candidate sectors, so that the current neighbor that was previously misidentified can be detected and updated.

13. The method of claim 12, wherein the step of selecting comprises determining that two or more candidate sectors qualify as most likely sectors.

14. The method of claim 13, wherein the step of selecting further comprises transmitting an appropriate notification that two or more candidate sectors qualify as most likely sectors.

15. The method of claim 14, wherein the step of selecting comprises determining the presence of a pilot reuse problem.

16. The method of claim 15, wherein the step of selecting further comprises transmitting an appropriate notification of a pilot reuse problem.

* * * * *